April 25, 1939.  F. E. MORRIS  2,155,612
APPARATUS FOR ARRANGING FRUIT HALVES
Filed May 28, 1937  2 Sheets-Sheet 1
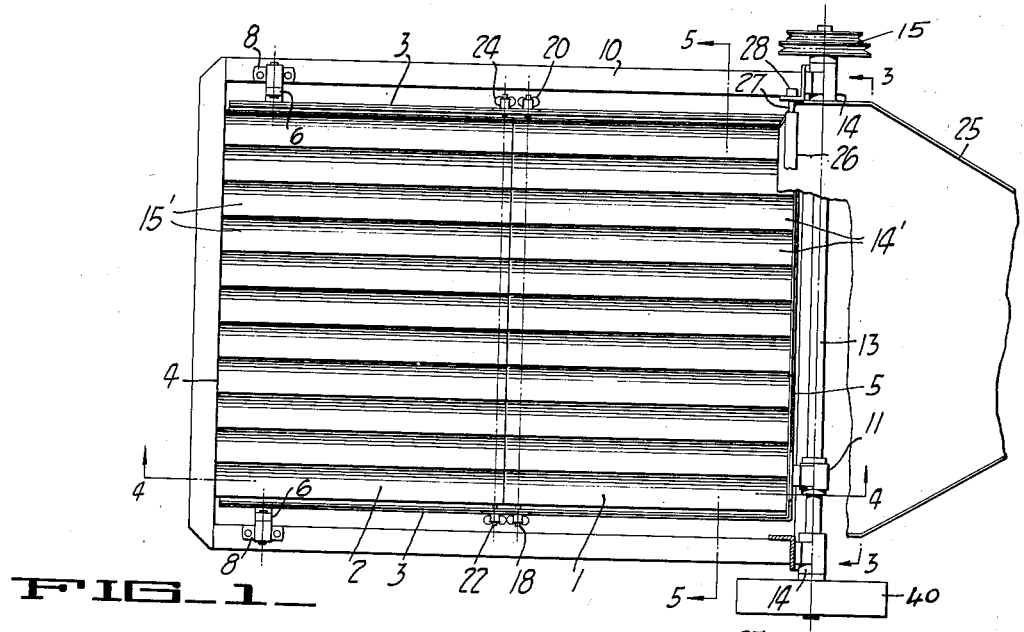
FIG_1_
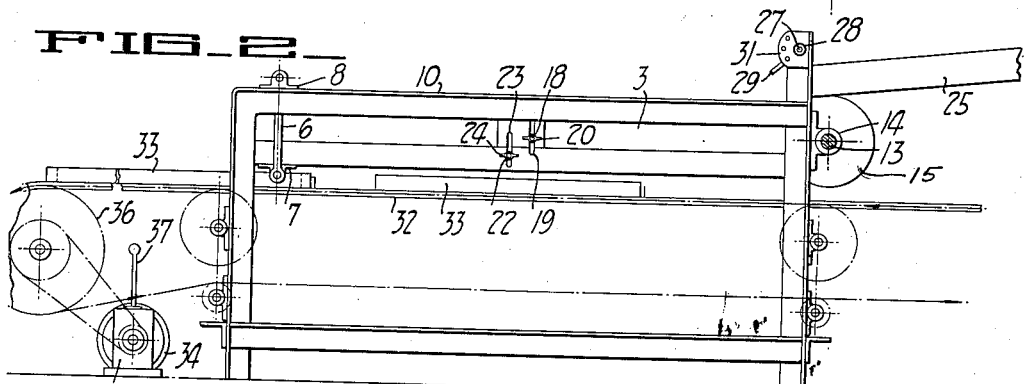
FIG_2_
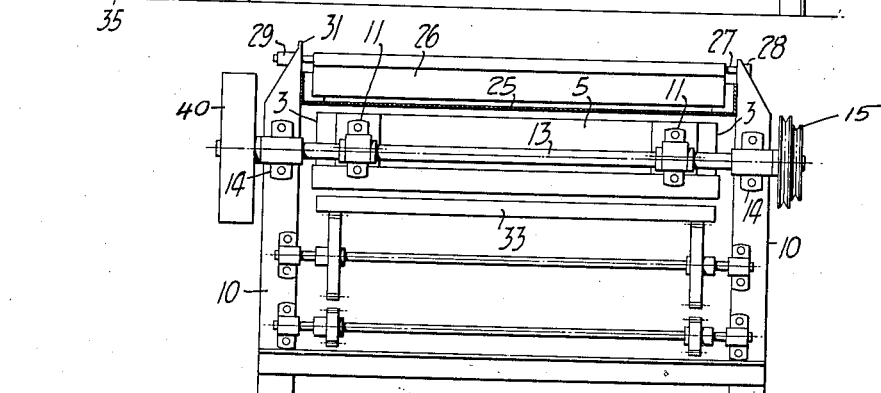
FIG_3_
INVENTOR.
FRED E. MORRIS
BY
Boyken & Mohler
ATTORNEYS

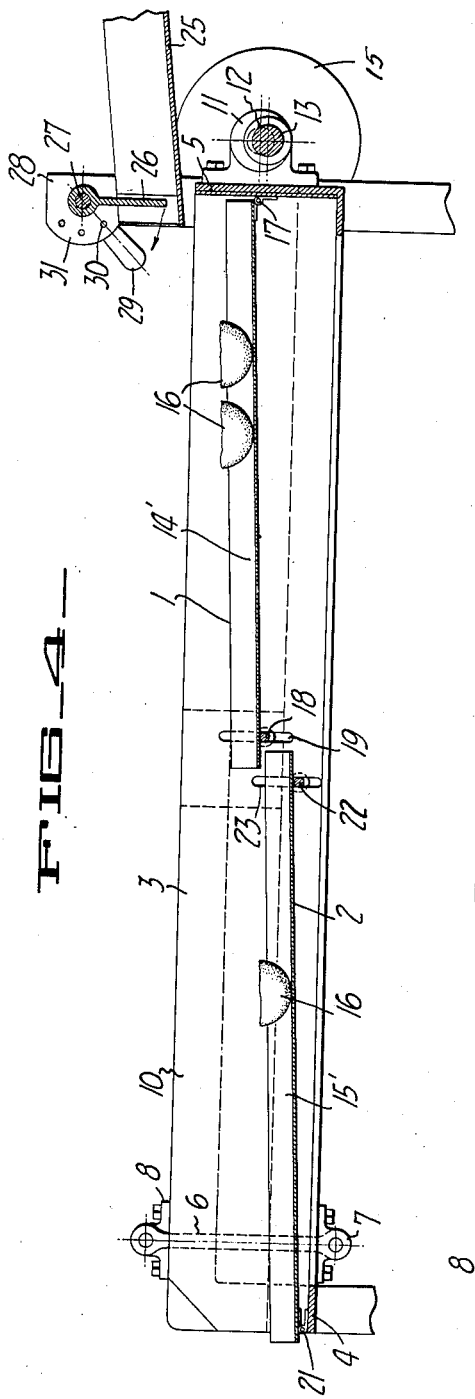

Patented Apr. 25, 1939

2,155,612

UNITED STATES PATENT OFFICE 2,155,612

APPARATUS FOR ARRANGING FRUIT HALVES

Fred E. Morris, Vernalis, Calif., assignor to Meridian, Ltd., Los Angeles, Calif., a corporation of Canada Application May 28, 1937, Serial No. 145,342

14 Claims. (Cl. 198—33)

This invention relates to apparatus for arranging fruit halves with their cup sides uppermost, and has for its objects apparatus and method for arranging large quantities of such fruit halves substantially simultaneously and with greater efficiency than heretofore and for continuously delivering said halves onto standard dimensional trays for conveying the same to a remote point for further treatment, such as for drying in the sun or in dehydrators or for other desired processing. Other objects and advantages will appear in the description and drawings annexed hereto.

Fig. 1 is a plan view of my device.

Fig. 2 is an elevational view of the device of Fig. 1, including the tray conveyor and motor for operating the same.

Fig. 3 is an elevational view of Fig. 1 taken along the line 3—3 of Fig. 1, showing the feed chute and conveyor in section.

Fig. 4 is an enlarged sectional view of the vibrating table of Fig. 1 taken along the line 4—4 of Fig. 1.

Fig. 5 is an enlarged sectional view of the vibrating table of Fig. 1 taken along the line 5—5 thereof.

Briefly described, heretofore it has been customary to turn fruit halves, such, for example as peaches, with their cup sides up by stationing several operators adjacent a table or conveyor belt onto which the peaches are dumped, which operators spread the peaches on the table or conveyor and turn them over by hand. Also, various devices have been made for turning the peaches individually with their cup sides up, but the slowness of this operation or the high expense where many such devices must be used to speed up the work, is prohibitive. There are also many devices for turning peach halves with their cup sides down preparatory to slicing, but this operation is relatively simple compared with the operation of turning the cup sides up. The purposes for turning the cup sides up are to enable the operators to readily sort out peaches or fruit having pits or parts of pits therein, and for drying purposes the cup or cut sides must be uppermost to facilitate drying.

With my device, I provide means for substantially simultaneously and continuously arranging a large number of fruit halves cup up and delivering said fruit in this position in a substantially evenly distributed layer onto trays for subsequent conveyance of the filled trays to a remote point for drying. I also provide means for quickly regulating the delivery of the arranged fruit to the trays according to size and quantity being fed to my device. I also provide means for regulating the quantity of fruit being fed to my device, which means is adapted to insure delivery of a single layer of halves onto said device.

In detail, my invention comprises a pair of tables or platforms substantially rectangular in plan view, which tables are similarly inclined slightly out of a horizontal plane and are generally disposed in horizontal continuation, but are slightly offset vertically with their adjacent margins in slightly overlapping relation, thus forming an upper table 1 and a lower table 2 with the lower edge of the upper table overlapping the upper edge of the lower table.

These tables are supported within a substantially rectangular frame, the opposite lateral sides 3 of which extend along the opposite inclined edges of the tables, and the other two opposite sides, 4, 5 of which respectively extend below the lower horizontally extending edge of the lower table and along the upper horizontally extending edge of the upper table.

The above described frame is swingingly supported by a pair of generally vertical hangers 6 pivoted at their lower ends in bearings 7 secured to sides 3 at points adjacent side 4, and pivoted at their upper ends in bearings 8 that are secured to a stationary frame 10, which latter frame supports the tables above the ground or floor. The upper side 5 of the swinging frame carries a pair of spaced bearings 11 in which eccentric cams 12 on a horizontal shaft 13 are mounted, said shaft rotatably extending at its ends through conventional bearings 14 secured on frame 10. The swinging frame extends horizontally and the trays are consequently slightly inclined relative to the frame. Upon rotation of shaft 13 by pulley 15, which is connected by a suitable belt to a source of power, it will be seen that the swinging frame will be vibrated horizontally at a speed depending upon the speed of shaft 13, and the tables 1, 2 will be similarly vibrated but being inclined relative to horizontal, fruit or fruit halves dropping onto the upper end of the upper table will receive a "kick" toward the lower end of said table and such fruit will pass onto lower table 2 and off the lower edge of said last mentioned table.

The tables 1, 2 respectively, are formed with straight substantially semi-cylindrical, parallel, adjoining troughs 14', 15' in the upper sides thereof, the troughs in each of the tables being in alignment in the direction of incline of the tables. These troughs (14' in table 1 and 15' in table 2)

have a cross-sectional contour on their upper concave surfaces substantially corresponding to the convex contour of the outer surface of the peach halves 16 or of the respective halves of fruit adapted to be fed onto the tables. The upper end of the upper table 1 is horizontally connected at 17 (Fig. 4) to side 5 of the swinging frame and said table is supported at its lower end on a cross bar 18 that extends at its opposite ends through vertical slots 19 in the opposite sides 3 of said frame. The ends of bar 18 are threaded and carry thumb nuts 20 thereon for tightening the bar in any desired degree of elevation, thus permitting adjustment of the degree of incline of table 1.

The lower end of table 2 is hinged at 21 to side 4 of the swinging frame, and the upper end is supported on a cross bar 22 that extends through vertical slots 23 in sides 3 of the frame, which bar carries thumb nuts 24 at its outer ends for permitting vertical adjustment of the bar, and consequently the degree of incline of table 2.

It is obvious, of course, that the above adjustment of the tables by virtue of the bars 18, 22, permits moving the overlapped ends of the tables relatively, as may be desired.

Extending over the upper end of table 1 is the feed chute 25 from which fruit halves are delivered onto the table 1.

Extending across the lower end of this feed chute is a swinging gate 26 secured on a shaft 27, which shaft rotatably extends at its ends through bearings 28 on frame 10. One end of the shaft carries a crank arm 29 for rotating the shaft clockwise and consequently swinging the gate 26 in the direction of the arrows, thus permitting fruit on said chute to pass below shaft 27 onto the upper table, the space between shaft 27 and the chute being such as to prevent more than substantially a single layer of fruit from passing onto the table. The crank 29 may be locked in any desired degree of revolution by a removable pin 30 extending through the arm and through holes in a segment 31 that is secured on the frame 10.

Below said tables 1, 2 and extending horizontally of grooves 14', 15' is an endless conveyor belt 32 adapted to support thereon a row of trays 33 for movement in the direction of the arrow. The conveyor is moved by means of any suitable motor 34 connected through gears in a continual transmission box 35 with pulley 36 mounting the belt. A clutch lever 37 provides means for regulating the movement of the conveyor as desired, and ordinarily an operator stands at said clutch and operates the same as desired for insuring an even distribution of fruit on the trays.

In operation, fruit halves are dumped in relatively large quantities on the feed chute 25, and in sliding down said chute tend to pile up at the center of the shaft 27 (when the gate 26 is raised), thus spreading the fruit over the length of the shaft and which fruit passes under the shaft onto the upper end of the table 1. The fruit halves that drop onto the table with the cup side up rapidly slide down the table 1 and onto the table 2 and from thence onto the trays 33 without turning over, but fruit that drops onto the table 1 in any other position are violently "kicked", as it were, until they turn with their cup sides up, when they will also rapidly pass over the tables onto the trays. In actual practice, with tables 1 and 2 respectively being 2 x 3 feet in size, I have passed approximately 50 tons of fruit per ten hour day over such tables with between 95 and 100% efficiency in properly turning the fruit.

The size and number of tables and adjustment of incline of the tables may, of course, be varied, and various feed devices may be used to feed fruit onto the tables. While a single table, such as table 1 only may be used, I find that the slight offset between the tables facilitates the turning of fruit halves that otherwise resist turning, and also in some instances it is preferable to give the lower table 2 a greater incline than the upper table to insure clearing the lower table more rapidly, while at other times it is preferable to do the reverse. In order to insure uniform movement of the tables by operation of the eccentrics, shaft 13 has a flywheel 40 mounted thereon. The term "troughs" as used, is intended to cover any suitable construction for supporting fruit halves with their convex sides within such troughs, and while bars or strips may be arranged to form troughs, the form shown in the drawings is preferable.

Having described my invention, I claim:

1. In apparatus of the character described for turning peach halves and the like to positions with their cut sides uppermost, an inclined table formed on its upper side to provide a plurality of elongated, parallel, trough-like supporting surfaces extending in the direction of incline of the table, said trough-like supporting surfaces being shaped to substantially engage the convex sides of the fruit halves and the lower ends of the trough-like surface being open to permit unobstructed discharge of the halves from the lower end of the table, means for feeding indiscriminately arranged peach halves onto the elevated end of the table, and means for vibrating the table generally horizontally in a direction generally longitudinally of the trough-like surfaces as against transverse movement thereof, whereby the peach halves on the table will be caused to arrange themselves in positions with their convex sides against said trough-like supporting surfaces for movement in said positions downwardly on said surfaces and over the lowered end of the table.

2. In a construction as defined in claim 1, means for raising and lowering the lower end of the table for changing the degree of incline of the table.

3. In a construction as defined in claim 1, conveyor means below the lower end of the table and adjacent thereto for receiving the peach halves discharged from said lower end of the table, said conveyor means being arranged and adapted to convey the peach halves away from the table.

4. Apparatus for turning peach halves and the like to positions with their cut sides uppermost comprising an inclined table formed on its upper surface to provide a plurality of adjacent, parallel, troughs extending longitudinally of the incline of the table, the upper sides of the troughs being shaped in cross-section to substantially conform to the contour of the convex outer sides of the peach halves, means for feeding the halves onto the elevated end of the table and means for rapidly moving said table generally horizontally in a substantially reciprocatory manner in a direction extending generally longitudinally of the troughs and means supporting said table in inclined relation to horizontal during said horizontal reciprocatory movement thereof.

5. A construction as defined in claim 4, said troughs being open along the lower end of the table to permit unobstructed movement of the halves out of the lowermost ends of the troughs.

6. Apparatus for turning peach halves and the like to positions with their cut sides uppermost comprising a table having an upper supporting surface formed to provide a pair of rows of parallel, elongated channels, each row being slightly inclined from the horizontal in the direction of the channels, the channels of one row being disposed in a plane elevated above the channels of the other row and the channels of each row being generally similarly inclined with the lower ends of the channels of the upper row disposed in slight overlapping relation to the elevated ends of the channels of the lower row, means for simultaneously moving the rows of channels generally horizontally in a reciprocatory manner in a direction generally longitudinally of the channels means supporting said rows of channels in their inclined positions relative to horizontal during the horizontal reciprocatory movement thereof, means for feeding peach halves onto the elevated end of the channel of the upper row for movement of the halves downwardly along the channels of said upper row and onto the elevated ends of the channels of the lower row, the lower ends of the channels of each of said rows being open and conveyor means below the open lower ends of the channels of the lower row for receiving peach halves passing out of said open lowered ends of the lower row of channels.

7. In a construction as defined in claim 6 means for varying the inclination of each of the rows of channels independently.

8. A construction as defined in claim 6, the channels respectively in each of the rows being generally semi-circular in cross-section and of a size to receive peach halves therein with the convex outer sides of the halves in substantial engagement with the semicircular surface of the channels.

9. Apparatus for turning peach halves and the like to positions with their cut sides uppermost comprising a table formed of a sheet of metal which sheet is corrugated to form parallel channels of uniform depth extending between two opposite edges of the sheet, said channels each being generally semicircular in cross-section and of a diameter approximately the diameter of peach halves whereby the convex sides of peach halves on the table will substantially fit within the channels with the cut sides in a plane adjacent the plane of the free edges of the channels, said sheet being inclined in the direction of the length of the channels, means for vibrating the sheet generally horizontally in a direction generally longitudinally of the channels, means for simultaneously feeding a plurality of peach halves onto the elevated ends of the table for passage of the halves down the channels and means supporting said sheet in its inclined position relative to horizontal during the generally horizontal vibratory movement thereof whereby substantially all points on the upper side of the inclined sheet will move in substantially horizontal planes as distinguished from the inclined plane of the sheet.

10. In apparatus of the character described for turning peach halves and the like to positions with their cut sides uppermost, an inclined table formed on its upper side to provide a plurality of elongated, parallel, trough-like supporting surfaces extending in the direction of incline of the table, said trough-like supporting surfaces being shaped to substantially engage the convex sides of the fruit halves and the lower ends of the trough-like surface being open to permit unobstructed discharge of the halves from the lower end of the table, means for feeding indiscriminately arranged peach halves onto the elevated end of the table, means for vibrating the table generally horizontally in a direction extending generally longitudinally of the trough-like surfaces as against transverse movement thereof whereby the peach halves on the table will be caused to arrange themselves in positions with their convex sides against said trough-like supporting surfaces for movement in said positions downwardly on said surfaces and over the lowered end of the table, and conveyor means adapted to support a plurality of horizontally disposed trays for movement past and adjacent the lower end of the table for receiving halves ejected from over the lower end of the table, and means for varying the rate of movement of said conveyor means to correspond to the rate of discharge of halves from said table for insuring an even distribution of the halves on trays adapted to be supported on said conveyor means and means supporting said table in its inclined position relative to horizontal during said horizontal vibratory movement thereof.

11. Apparatus for turning peach halves and the like to positions with their cut sides uppermost comprising a table formed of a sheet of metal which sheet is corrugated to form parallel channels of uniform depth extending between two opposite edges of the sheet, said channels each being generally semi-circular in cross-section and of a diameter approximately the diameter of peach halves whereby the convex sides of peach halves on the table will substantially fit within the channels with the cut sides in a plane adjacent the plane of the free edges of the channels, said sheet being inclined in the direction of the length of the channels, means for vibrating the sheet generally horizontally in a direction generally longitudinally of the channels as against transverse movement thereof, means for simultaneously feeding a plurality of peach halves onto the elevated ends of the table for passage of the halves down the channels, and means for varying the incline of the sheet comprising hinge means at one edge of the sheet and a bar extending horizontally across and below the sheet adjacent the opposite edge, said sheet being supported on said bar and means for mounting said bar for movement to various elevations.

12. In apparatus of the character described for turning peach halves and the like to positions with their cut sides uppermost, an inclined table formed on its upper side to provide a plurality of elongated, parallel, trough-like supporting surfaces extending in the direction of incline of the table, said trough-like supporting surfaces being shaped to substantially engage the convex sides of the fruit halves and the lower ends of the trough-like surface being open to permit unobstructed discharge of the halves from the lower end of the table, means supporting said table inclined relative to horizontal for substantially horizontal reciprocatory movement thereof, means for feeding indiscriminately arranged peach halves onto the elevated end of the table, and means for vibrating the table bodily generally horizontally in a direction longitudinally of the through-like surfaces as against transverse movement thereof whereby the peach halves on the table will be caused to arrange themselves in positions with their convex sides against said trough-like supporting surfaces for movement in said positions downwardly on said surfaces and over the lowered end of the table.

13. Means for causing peach halves to be delivered at a delivery point with their flat sides up comprising a table providing a surface having parallel adjacent channels of about semi-circular cylindrical shape, means supporting a delivery end of said table surface for oscillatory reciprocatory movement generally horizontally in direction extending generally longitudinally of the channels as against transverse movement thereof, and means supporting the other end of said table slightly vertically displaced from said delivery end at all times and for driving said other end in a generally circular path of travel disposed in a plane at right angles to the plane of the table.

14. A construction as in claim 13, said first means comprising an elongated vertical link one end of which is pivoted to said table at said delivery end, the other end being pivoted to a stationary member, and the second supporting means comprising a shaft mounted for rotation in a fixed frame, an eccentric cam on said shaft, and a bearing on said table receiving said cam.

FRED E. MORRIS.